United States Patent [19]

Ryan

[11] Patent Number: 5,004,355
[45] Date of Patent: Apr. 2, 1991

[54] TEMPERATURE MEASURING APPARATUS

[75] Inventor: Wayne L. Ryan, Omaha, Nebr.

[73] Assignee: Streck Laboratories, Inc., Omaha, Nebr.

[21] Appl. No.: 417,045

[22] Filed: Oct. 4, 1989

[51] Int. Cl.$^5$ .............................................. G01K 5/002
[52] U.S. Cl. ...................................... 374/194; 374/208
[58] Field of Search ...................... 211/75; 248/206.5; 374/190, 191, 194, 208, 210, 192, 193, 187

[56] References Cited

U.S. PATENT DOCUMENTS

| | | | |
|---|---|---|---|
| 167,327 | 8/1875 | Gall | 374/194 |
| 1,612,592 | 12/1926 | McFarland | 374/208 |
| 1,808,351 | 6/1931 | Hill | 374/109 |
| 1,994,200 | 3/1935 | Parker | 211/88 |
| 2,879,666 | 3/1959 | Brown | 374/194 |
| 2,943,745 | 7/1960 | Bjornson | 211/75 |
| 3,009,217 | 11/1961 | Weiner | 374/208 |
| 3,321,068 | 5/1967 | Beach | 206/306 |
| 3,518,884 | 7/1970 | Wood, Jr. | 374/194 |
| 3,982,716 | 9/1976 | Trees | 248/311 A |
| 4,062,450 | 12/1977 | Carter | 206/485 |
| 4,508,303 | 4/1985 | Beckerer, Jr. | 248/311.2 |

FOREIGN PATENT DOCUMENTS

| | | | |
|---|---|---|---|
| 1421505 | 11/1965 | France | 248/206.5 |
| 146626 | 8/1954 | Sweden | 374/194 |
| 9870 | 3/1896 | United Kingdom | 374/194 |

Primary Examiner—William A. Cuchlinski, Jr.
Assistant Examiner—W. Morris Worth
Attorney, Agent, or Firm—Larson & Taylor

[57] ABSTRACT

A temperature measuring apparatus includes a tubular bulb thermometer disposed in a receptacle having a liquid isothermal bath therein. The bulb of the thermometer is sealed in the receptacle and a transparent cover member surrounds the receptacle and thermometer to protect the receptacle and thermometer. However, if breakage does occur, the cover member prevents any leakage or pieces of the thermometer or receptacle outside of the cover member. A U-shaped bracket having a magnet thereon is used to attach the cover member to a vertical wall as well as to space the cover member from the wall.

9 Claims, 1 Drawing Sheet

TEMPERATURE MEASURING APPARATUS

FIELD OF THE INVENTION

The present invention relates generally to a temperature measuring apparatus, and more particularly to such an apparatus which is conveniently and safely mounted to a vertical wall.

BACKGROUND OF THE INVENTION

Various thermometer devices have been disclosed in prior art for measuring the temperature of an environment. For example, in U.S. Pat. No. 3,518,884 (Wood, Jr.), a magnetic thermometer mounting structure is disclosed which can be mounted to a window to measure both inside and outside temperature. With this device, separate thermometers are spaced from the window on the inside and outside, and are both readable from the inside.

Various holders for thermometers have also been disclosed in prior art. For example, in U.S. Pat. No. 3,321,068 (Beach), a thermometer set is disclosed in which a clinical thermometer is disposed in a receptacle containing a disinfectant. A "Velcro" fastener or the like is used to attach the receptacle to a wall at a convenient location. The thermometer extends out of the receptacle so as to be easily grasped and rests on the bottom of the receptacle on cotton or gauze or the like. Thus, before its use, a thermometer is maintained in a suitable disinfectant.

There has also been a number of various holders disclosed in the prior art for various devices. Holders which mount an object away from an adjacent wall and are of general interest include the following: U.S. Pat. No. 1,994,200 (Parker); U.S. Pat. No. 4,062,450 (Carter); U.S. Pat. No. 4,508,303 (Beckerer, Jr.); U.S. Pat. No. 3,982,716 (Trees); and French Pat. No. 1,421,505 (Sinder).

SUMMARY OF THE INVENTION

In accordance with the present invention, a temperature measuring apparatus includes a tubular bulb thermometer or the like in which the bulb is disposed in a receptacle. The receptacle contains a liquid and a top having a sealed opening through which the thermometer sealingly extends down into the liquid. A transparent cover member surrounds the sealed opening of the receptacle and at least that part of the thermometer extending beyond the receptacle in order to protect the thermometer. Preferably, the cover member surrounds the entire receptacle as well as the thermometer and has a bottom against which the receptacle rests. A holder means then holds the receptacle adjacent a vertical wall of an environment whose temperature is to be measured. The holder means includes a spacer means for spacing the receptacle away from the wall and a mounting means for removably mounting the holder means to the wall.

In the preferred embodiment, the receptacle is transparent so that the immersion of the bulb in the liquid is viewable. Further, the cover member completely encloses the receptacle and thermometer so as to be liquid tight and thus to prevent any spillage of the liquid in the thermometer or liquid in the receptacle even if breakage should somehow occur.

The holder means is preferably a U-shaped bracket having a center part to which the mounting means is attached so that the bracket is mounted with the center part parallel to the wall and with an upper leg extending above a lower leg. The upper leg is then provided with an aperture through which the receptacle extends and rests on the lower leg. The mounting means is preferably simply a magnet attached to the center part.

It is an advantage of the present invention that a thermometer is easily and quickly mounted adjacent a wall.

It is also an advantage of the present invention that the thermometer bulb is disposed in a liquid medium rather than air so that the temperature indicated by the thermometer will not quickly change such as by the opening of a refrigerator door.

It is a further advantage of the present invention that the thermometer (including the liquid) as well as the receptacle (including the liquid) are contained in a liquid-tight cover member. This cover member both helps to protect the receptacle and thermometer from breakage as well as to prevent any contamination of the environment by pieces or liquid should the receptacle or thermometer break.

Other features and advantages of the present invention are stated in or apparent from a detailed description of a presently preferred embodiment of the invention found hereinbelow.

DETAILED DESCRIPTION OF THE PREFERRED EMBODIMENT

Figures 1, 2:
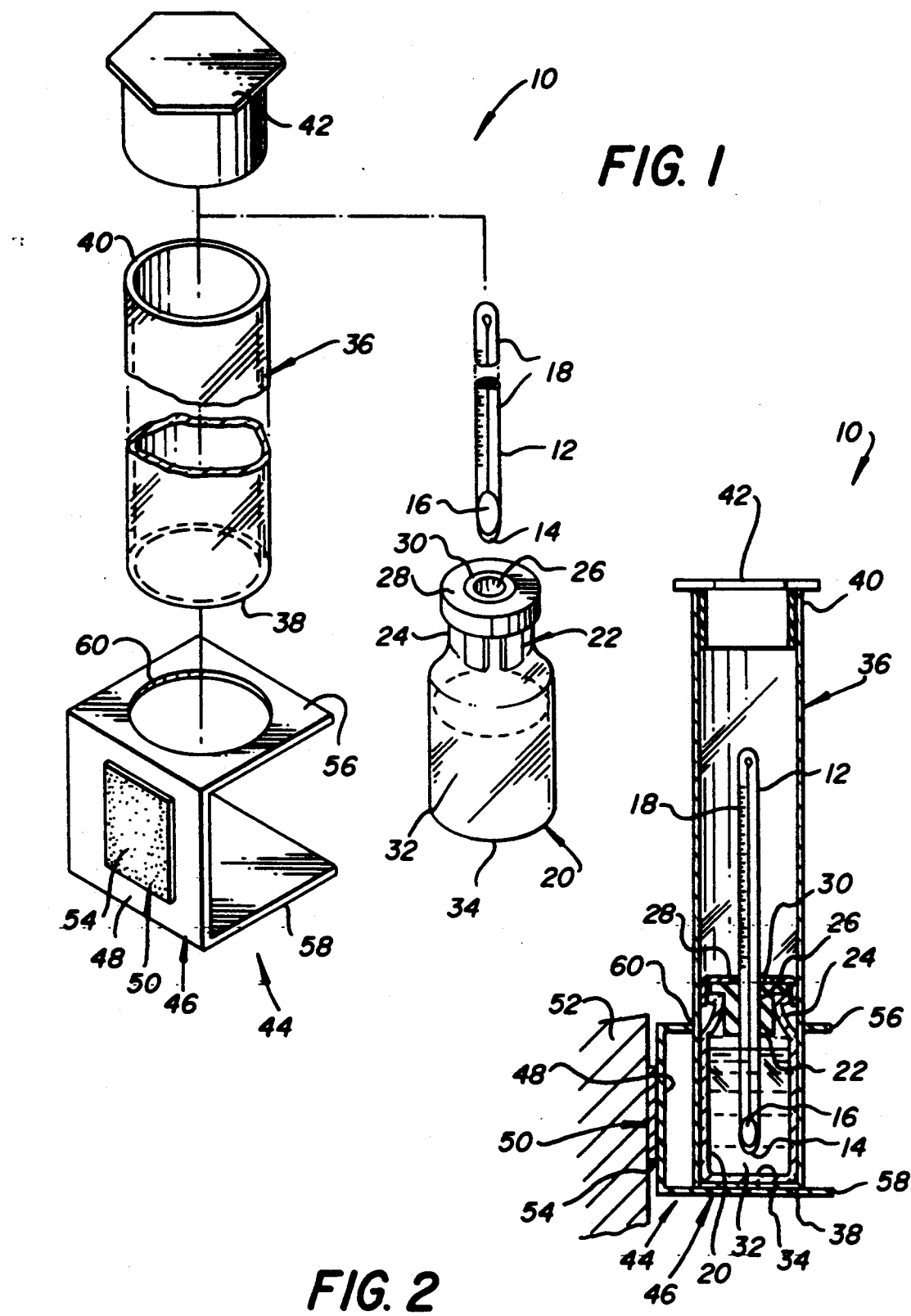
FIG. 1 is an exploded perspective view of the temperature measuring apparatus according to the present invention.
FIG. 2 is a cross-sectional elevation view of the temperature measuring apparatus depicted in FIG. 1.

With reference now to the drawings in which like numerals represent like elements throughout the two views, a temperature measuring apparatus 10 is depicted in FIGS. 1 and 2. Temperature measuring apparatus 10 includes a common tubular bulb thermometer 12. Thermometer 12 includes a bulb 14 in which a suitable expandable liquid 16 is contained. At the other end of thermometer 12, suitable indicia 18 is provided which cover the range anticipated for temperature measuring apparatus 10.

Thermometer 12 is mounted in a receptacle 20 as shown in FIG. 2. Receptacle 20 is preferably transparent and includes a seal means 22 at a top 24 thereof whereby a sealed opening 26 is provided. In order to maintain seal means 22 in top 24, a suitable cap 28 is mounted on top 24. Cap 28 includes an aperture 30 through which thermometer 12 extends as shown. It should be appreciated that seal means 22 frictionally receives thermometer 12 so that bulb 14 is disposed in a liquid 32 provided in receptacle 20 with bulb 14 held by seal means 22 above a bottom 34 of receptacle 20.

Liquid 32 provided in receptacle 20 is particularly adapted to remain a liquid over the temperature range to be measured by thermometer 12. Typically, liquid 32 is a mixture of water and ethylene glycol which provides a wide range over which liquid 32 will remain liquid. As mentioned above, receptacle 20 is preferably transparent, and is conveniently made of glass. By suitably coloring liquid 32, it is easy for the user to view bulb 14 in receptacle 20 and make sure that bulb 14 is disposed in liquid 32 as desired. It should be appreciated that liquid 32 provides an isothermal both for thermometer 12 so that momentary fluctuations in the air temperature surrounding receptacle 20 will not cause the temperature indicated by thermometer 12 to vary immediately. This is particularly important where temperature measuring apparatus 10 is disposed in a refrigerator or freezer or the like where the door must be opened in order to read the temperature of thermometer 12.

Receptacle 20 is slideably received in a cylindrical cover member 36. Cover member 36 is made of a transparent plastic or the like. Receptacle 20 rests against a bottom 38 of cover member 36 as shown in FIG. 2. In this position, indicia 18 of thermometer 12 are thus readable through cover member 36. Closing an open top 40 of cover member 36 is a cap 42. With cap 42 in place, cover member 36 is thus liquid tight.

In order to mount cover member 36 with receptacle 20 and thermometer 12 therein, a holder means 44 is utilized. Holder means 44 is in the form of a U-shaped plastic bracket 46 having a center part 48. Attached to center part 48 is a mounting means 50 for mounting holder means 44 to a wall 52 or the like. Where wall 52 is made of a suitable metal, mounting means 50 is preferably a magnet 54 which is simply glued to U-shaped bracket 46. Other mounting means are also possible, such as Velcro fasteners or the like.

U-shaped bracket 46 includes an upper leg 56 and a lower leg 58. Upper leg 56 has an aperture 60 therein which is slightly larger than the lateral cross section of cover member 36. Thus, as shown best in FIG. 2, cover member 36 is received through aperture 60 with bottom 38 of cover member 36 resting on lower leg 58 of U-shaped bracket 46. In this position, it should be appreciated that upper leg 56 and lower leg 58 act as a spacer means for spacing cover member 36, and in particular receptacle 20 and thermometer 12, away from wall 52. Thus, thermometer 12 measures the surrounding air temperature without being affected by wall 52.

In operation, temperature mounting apparatus 10 is used in the following manner. For example, temperature mounting apparatus 10 can be used in laboratories where it is required to monitor temperature dependent equipment or materials which are maintained in a refrigerator or freezer. If maintained in a freezer, thermometer 12 conveniently measures a temperature range of about −15° C. to 0° C. by indicia 18. For a refrigerator, an appropriate temperature range would be −5° C. to 15° C. As such refrigerators or freezers typically include a metal wall, U-shaped bracket 46 is simply attached to wall 52 by use of magnet 54. With cover member 36 located in U-shaped bracket 46 and containing receptacle 20 and thermometer 12 as shown in FIG. 2, the temperature of the refrigerator or freezer is then easily checked by the user by simply viewing indicia 18 through transparent cover member 36.

It should be appreciated that when the user opens the door of the refrigerator or the like to view indicia 18, the air temperature in the environment will immediately change by exposure to the outside air. However, because bulb 14 of thermometer 12 is maintained in liquid 32 which acts as a heat sink, the temperature measured by thermometer 12 will not change during the time period necessary to make a suitable reading. The spacing of receptacle 20 and thermometer 12 from wall 52 also assures that an accurate measure of the inside temperature of the refrigerator or freezer is obtained without being affected by wall 52.

It should also be appreciated that cover member 36 performs two important functions. First, cover member 36 protects receptacle 20 and especially thermometer 12 from breakage. Without cover member 36, the top portion of thermometer 12 would easily be broken by inadvertent contact therewith. Second, as some of the materials or equipment maintained in the environment may be adversely affected or ruined by any contamination (either liquid or broken pieces of glass or the like), cover member 36 also prevents any contamination should thermometer or receptacle 20 break. By use of cap 42, cover member 36 is maintained liquid tight so that even if some breakage did occur, no liquid contamination would reach the environment outside of cover member 36.

While the present invention has been described with respect to an exemplary embodiment thereof, it will be understood by those of ordinary skill in the art that variations and modifications can be effected within the scope and spirit of the invention.

What is claimed is:

1. A temperature measuring apparatus comprising:
    an elongate thermometer including a bulb filled with an expansible fluid and a tube into which the fluid expands;
    a receptacle in which an isothermal liquid bath is contained, said receptacle including a top having a sealed opening through which said tube of said thermometer sealingly extends with said bulb immersed in and directly contacting said liquid bath;
    protection means for protecting said tube from inadvertent breakage and for preventing environmental contamination by said tube if broken, including a transparent cover member which surrounds said receptacle and that portion of said tube of said thermometer extending beyond said receptacle to protect said tube; and
    a holder means for holding said receptacle adjacent a vertical wall of an environment where temperature is to be measured, said holder means including a spacer means for spacing said receptacle away from the wall so that a space is provided therebetween and a mounting means for removably mounting said spacer means to the wall.

2. A temperature measuring apparatus as claimed in claim 1 wherein said receptacle is transparent so that the immersion of said bulb in said liquid both is viewable.

3. A temperature measuring apparatus as claimed in claim 2 wherein said cover member includes a removable cap and said receptacle is slidably received in said cover member.

4. A temperature measuring apparatus as claimed in claim 1 wherein said mounting means is a magnet secured to said holder means.

5. A temperature measuring apparatus as claimed in claim 1 wherein said spacer means includes a U-shaped bracket which has a center part to which said mounting means is attached whereby said bracket is mounted with said center part parallel to the wall and with an upper leg extending above a lower leg, said upper leg having an aperture therein through which said receptacle extends while said receptacle rests on said lower leg.

6. A temperature measuring apparatus comprising:
    a tubular bulb thermometer having a bulb containing an expandable fluid at one end and indicia along said thermometer adjacent the other end;
    a cylindrical receptacle for said thermometer, said receptacle including an isothermal liquid bath therein in which said bulb of said thermometer is immersed and directly contacting and a seal means in a top thereof for sealing about said thermometer while leaving said indicia outside of said receptacle;

a cylindrical member which surrounds said receptacle and said thermometer, said cylindrical member including a transparent portion adjacent said indicia of said thermometer, a bottom against which said receptacle rests, and a removable liquid-tight cap;

a holder means for holding said cylindrical member adjacent a vertical wall of an environment to be measured, said holder means including (a) a U-shaped bracket having a center part which is mounted to the wall such that an upper leg of said U-shaped bracket extends horizontally from the wall and above a lower leg of said U-shaped bracket, said upper leg including an aperture therein which is spaced from said center part and through which said cylindrical member extends with said bottom of said cylindrical member resting on said lower leg, and (b) a mounting means attached to said center part for removably mounting said bracket to the wall.

7. A temperature measuring apparatus as claimed in claim 6 wherein said seal means also securely holds said thermometer with said bulb suspended above said bottom of said receptacle.

8. A temperature measuring apparatus as claimed in claim 6 wherein said cover member is transparent along the length thereof and is sized to frictionally receive said receptacle slidably therein.

9. A temperature measuring apparatus as claimed in claim 6 wherein said mounting means is a magnet attached to said center part.

* * * * *